No. 788,446. PATENTED APR. 25, 1905.
A. R. WILSON.
METHOD OF COOLING MELTED FATTY SUBSTANCES.
APPLICATION FILED SEPT. 23, 1904.
2 SHEETS—SHEET 1.
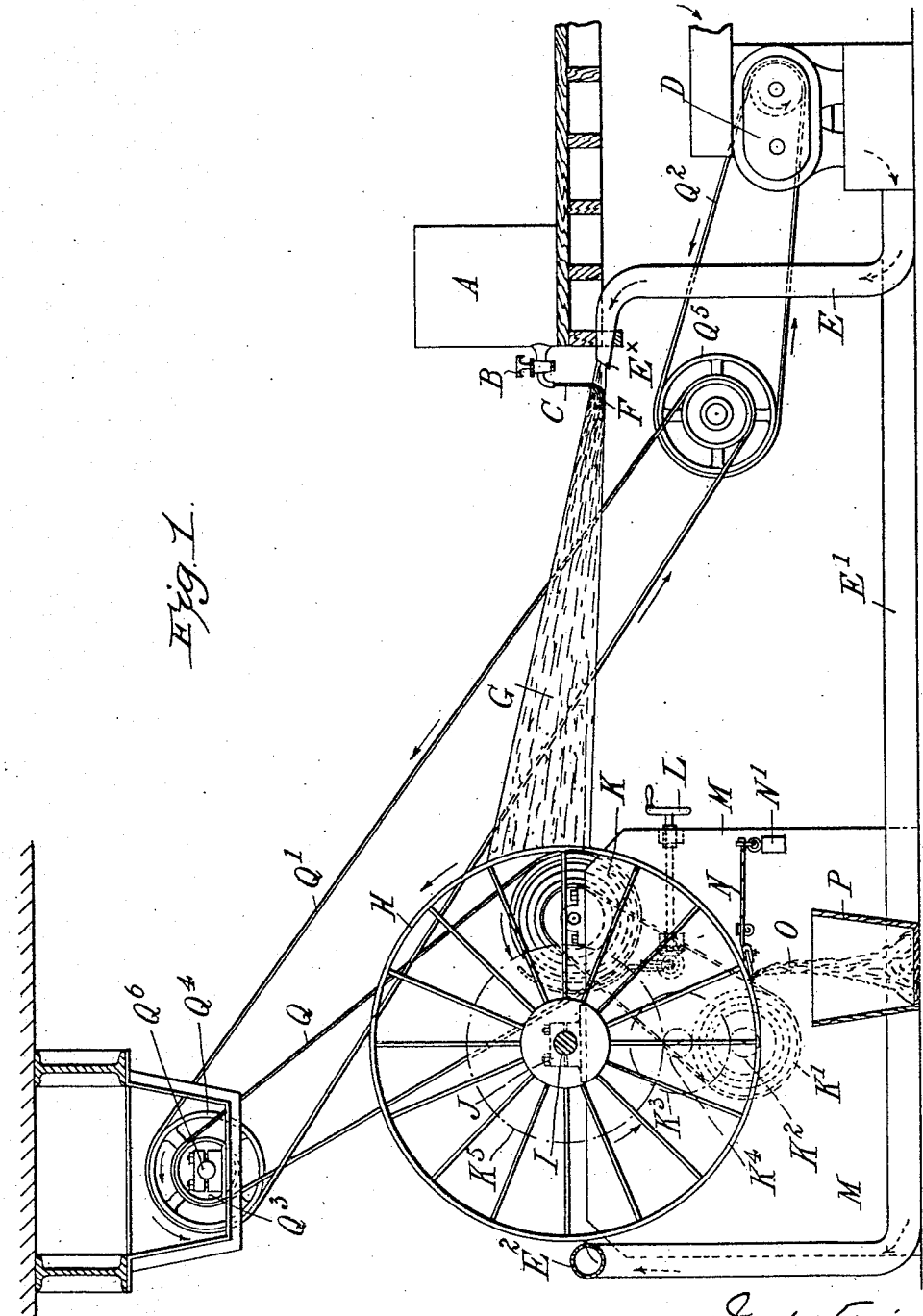

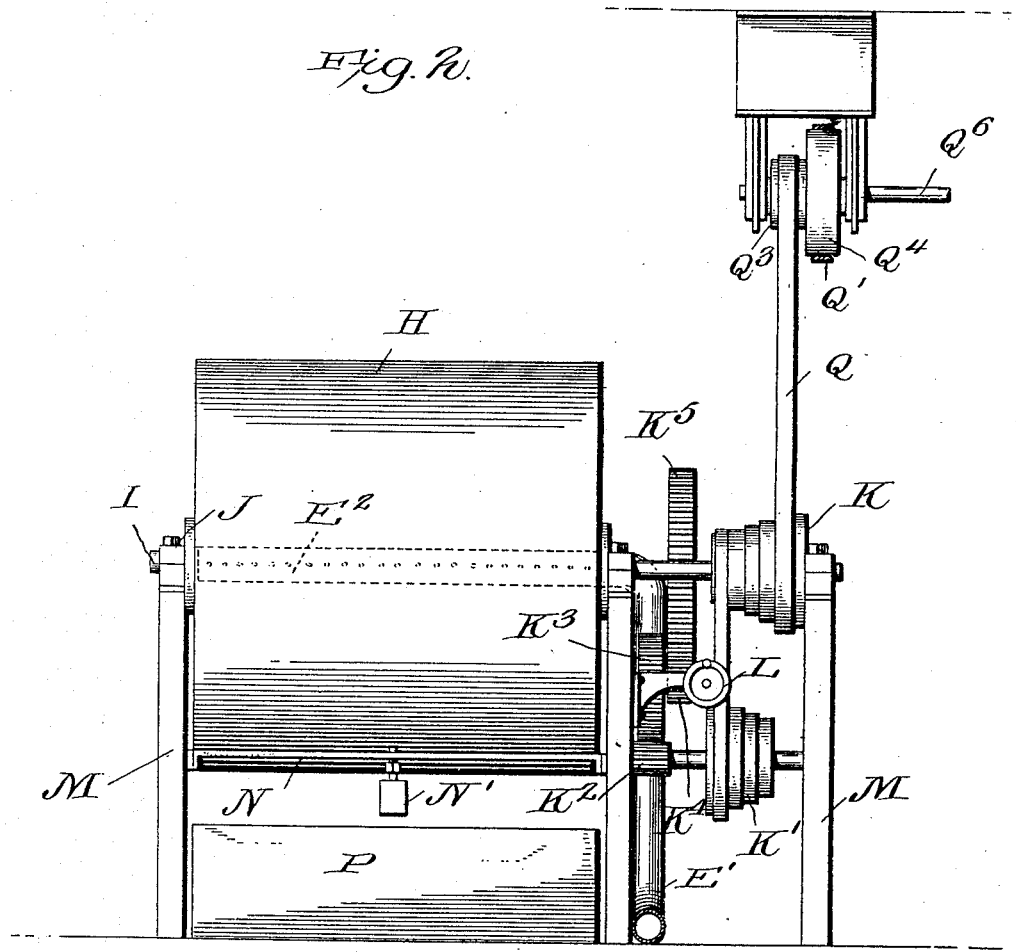

No. 788,446.

Patented April 25, 1905.

UNITED STATES PATENT OFFICE.

ARCHIBALD RALPH WILSON, OF HOVE, BRIGHTON, ENGLAND, ASSIGNOR TO ALBERT ERNEST IVESON, OF GAINSBOROUGH, ENGLAND.

METHOD OF COOLING MELTED FATTY SUBSTANCES.

SPECIFICATION forming part of Letters Patent No. 788,446, dated April 25, 1905.

Application filed September 23, 1904. Serial No. 225,706.

*To all whom it may concern:*

Be it known that I, ARCHIBALD RALPH WILSON, chemist, a subject of the King of Great Britain and Ireland, residing at "Silverlea," Portland Villas, Hove, Brighton, in the county of Sussex, England, have invented a certain new and useful Method of Cooling Melted Fatty Substances, of which the following is a specification.

This invention relates to cooling melted fats or fatty substances or the like whereby great advantages are obtained—notably, such fats or fatty substances or the like are cooled according to this invention in such wise that in the process of cooling "seeding" or unequal cooling is prevented or greatly reduced and the resulting product is even in consistency and of a homogeneous character.

The invention is applicable and useful for the following purposes: cooling soap which is liquid or similiquid when hot and solid or set when cold, cooling tallow vegetable fats and such like substances which are liquid when hot and solid or set when cold, and cooling mixtures of melted fats such as are mixed together in a melted condition and used in the process of manufacturing margarin or the like.

According to this invention the hot or warm liquid or semiliquid fat which it is desired to cool is allowed to fall or run in its melted or semiliquid state through a suitable aperture, such as a tube or tap or other outlet from a tank or vessel containing the mass to be cooled, and as said fat is being so discharged from such tap or outlet a strong jet of cold air or other suitable blast is directed and caused to so strike or meet or act on the falling liquid fat that the latter is broken up into a finely-divided state or in the form of a spray which is driven in the direction of said air jet or blast. Such blast may advantageously be supplied by means of ordinary atmospheric air drawn or forced through a chamber packed with ice or ice and salt or other refrigerating-chamber, (not shown,) any suitable fan or pump or other convenient means being employed in order to produce said air-jet under pressure. The fat thus finely divided or sprayed is directed toward and deposited upon a collecting-surface provided in suitable position to receive such fat thereon. Such collecting-surface is preferably in the form of a rotating drum or cylinder, which may advantageously be formed hollow of any suitable metal, and means may be provided to keep said drum or cylinder cold or cool. For example, said drum may be packed with ice, or ice and salt, or any other convenient means may be employed. Means are provided to scrape or remove the fat thus sprayed or deposited on the said drum or cylinder in order to collect same in a suitable collecting vessel or receptacle—for example, a vertical or other suitable scraper may be arranged near the lower part of said revolving drum or cylinder in such position as to scrape or remove the now cooled fat off the periphery of the drum or cylinder as the latter rotates, thus leaving a clear surface to again and continuously receive the fat sprayed thereonto, the fat thus scraped off said drum falling automatically from the scraper into a suitable receptacle placed below to receive same—as, for example, a trough or tub.

In the accompanying drawings I have illustrated, by way of example, a convenient apparatus for carrying my said invention into practice, Figure 1 being a side elevational view thereof, and Fig. 2 being a front elevational view of the rotary drum and the various mechanism connected therewith.

A is the vessel containing the hot fatty substances to be cooled, and it may also contain a regulated quantity of water or other liquid in case it is desired that the fatty substance on solidification should contain an added and definite percentage of moisture.

B is a controlled opening of any well-known or convenient kind from which the fat is allowed to escape. C represents the stream of fat falling from the said opening.

D represents any convenient mechanism for producing a continuous jet or blast of air, such as a rotary blower of any well-known type, pump, compressor-fan, or the like, provided that same is capable of producing and maintaining a blast of sufficient intensity and pressure. E is delivery-pipe from said blower, and $E^x$ is the nozzle from which the blast of air is delivered in the direction of the drum H. When the hot fat is allowed to fall from the opening B, the blower D is at work, and the tank A is so located that the fat falls somewhere about the point F—i. e., into the path of the air-blast as it comes from the nozzle $E^x$. As the necessary velocity has been imparted to the said air-blast, the hot fat is diverted by it and is carried (mingled with the air-blast) in a finely-divided stream G onto the face of the rotating drum or cylinder H, which is fixed at a suitable distance from the nozzle $E^x$, on which drum H it adheres.

I is the spindle, and J is the bearing supporting the drum H, which may be of any convenient diameter and length varying with the size of the particular installation.

The drum H is made to rotate, preferably slowly, by means of any convenient form of gearing—such, for example, as the stepped pulleys K, driven by the source of power and connected by a belt with a second stepped pulley K'. The pulley K' rotates the toothed wheel $K^2$, and the latter through the toothed wheels $K^3$, $K^4$, and $K^5$ thereby rotates the drum H.

L represents any simple and well-known form of belt-shifting device to vary the speed of the drum H.

M is one of the side frames supporting the bearings J and the drum H.

N is a scraper, or it may be one of several scrapers, which by any suitable means, as a counterweight N', is kept in contact with the rotating face of the drum H at that point of its circumference at which it is desired to remove the fat from said drum.

P is the receptacle into which the fat drops as it is scraped off by the scraper N.

E' is branch air-pipe from the blower D, which may conveniently be carried across the face of the drum H and terminates at $E^2$, (preferably at a point of the circumference of the drum H remote from that at which the stream of fat impinges,) and by means of perforations at the point $E^2$ in the side of said pipe E' streams of air can be locally directed at this point onto the face of said drum, and so assist to cool it and the fat on it.

Motion is imparted to the drum H and the blower D through the driving-pulleys K K' from a suitable outside source in any convenient manner—as, for example, by the belts Q, Q', and $Q^2$ and the pulleys $Q^3$, $Q^4$, and $Q^5$ from a main driving-shaft $Q^6$.

It will be obvious that this invention is not confined to the particular means hereinbefore described for carrying it into practice, as many and various changes, alterations, and substitutions may be made therein and still advantageously obtain the results desired.

By the use of the word or expression "fat" in this specification and in the following claims I mean and intend to include any fat or combination of fats or fatty substances or the like—such, for example, as soap, tallow, &c.—which are liquid or semiliquid when hot and solid or set when cold.

What I claim is—

1. The process for treating fat which consists in heating such fat to a liquid or semiliquid state, then while in this melted condition subjecting same to the action of a blast, and projecting said fat in a finely-divided condition by means of said blast onto a cooled moving surface adapted to receive same.

2. The method of cooling melted fatty substances which consists in subjecting the substance to the action of a blast and projecting the therein-contained fat in a finely-divided condition by means of said blast onto a moving surface adapted to receive same.

3. The method of cooling melted fatty substances which consists in subjecting the substance to the action of a blast of aeriform fluid and projecting the therein-contained fat in a finely-divided condition by means of said blast onto a moving surface adapted to receive same.

4. The method of cooling melted fatty substances which consists in subjecting the substance to the action of an air-blast and projecting the therein-contained fat in a finely-divided condition by means of said blast onto a moving surface adapted to receive same.

5. The method of cooling melted fatty substances which consists in subjecting the substance to the action of a cooled air-blast and projecting the therein-contained fat in a finely-divided condition by means of said blast onto a moving surface adapted to receive same.

6. The method of cooling melted fatty substances which consists in subjecting the substance to the action of a blast and projecting the therein-contained fat in a finely-divided condition by means of said blast onto the surface of a rotating drum adapted to receive it.

7. The method of cooling melted fatty substances which consists in subjecting the substance to the action of a cooled air-blast and projecting the therein-contained fat in a finely-divided condition by means of said blast onto the surface of a rotating drum adapted to receive it.

8. The method of cooling melted fatty substances which consists in subjecting the substance to the action of a blast and projecting the therein-contained fat in a finely-divided condition by means of said blast onto a moving surface adapted to receive same and then removing said fat from said surface.

9. The method of cooling melted fatty substances which consists in subjecting the substance to the action of a cooled air-blast and projecting the therein-contained fat in a finely-divided condition by means of said blast onto a moving surface adapted to receive same and then removing said fat from said surface.

10. The method of cooling melted fatty substances which consists in subjecting the subtherein-contained fat in a finely-divided condition by means of said blast onto the periphery of a rotating drum at one point around its circumference and at another point scraping off said deposited fat from the periphery of said drum.

11. The method of cooling melted fatty substances which consists in subjecting the substance to the action of an air-blast, projecting the therein-contained fat in a finely-divided condition by means of said blast onto the periphery of a rotating drum at one point around its circumference and at another point scraping off said deposited fat from the periphery of said drum.

12. The method of cooling melted fatty substances which consists in subjecting the substance to the action of a cooled air-blast projecting the therein-contained fat in a finely-divided condition by means of said blast onto the periphery of a rotating drum at one point around its circumference and at another point scraping off said deposited fat from the surface of said drum.

13. The method of cooling melted fatty substances which consists in subjecting the substance to the action of a blast and projecting the therein-contained fat in a finely-divided condition by means of said blast onto a moving surface adapted to receive same and then further cooling said fat locally on said surface.

14. The method of cooling melted fatty substances which consists in subjecting the substance to the action of a cooled air-blast and projecting the therein-contained fat in a finely-divided condition by means of said blast onto a moving surface adapted to receive same and then further cooling said fat locally on said surface.

15. The method of cooling melted fatty substances which consists in subjecting the substance to the action of a blast and projecting the therein-contained fat in a finely-divided condition by means of said blast onto a surface adapted to receive same, and then further cooling said fat locally on said surface at a point distant from the point of deposit.

16. The method of cooling melted fatty substances which consists in subjecting the substance to the action of a blast and projecting the therein-contained fat in a finely-divided condition by means of said blast onto a moving surface adapted to receive same and then further cooling said fat locally on said surface at a point distant from the point of deposit.

17. The method of cooling melted fatty substances which consists in subjecting the substance to the action of a blast and projecting the therein-contained fat in a finely-divided condition by means of said blast onto a moving surface, then further cooling said fat locally at a point distant from the point of deposit, and then removing said fat from said surface.

18. The method of cooling melted fatty substances which consists in subjecting the substance to the action of a blast and projecting the therein-contained fat in a finely-divided condition by means of said blast onto the surface of a rotating drum, then further cooling said fat locally at a point substantially diametrically opposite the point of deposit, and then removing said fat from said drum.

19. The method of cooling melted fatty substances which consists in subjecting the substance to the action of a blast and projecting the therein-contained fat in a finely-divided condition by means of said blast onto a previously-cooled moving surface, then further cooling said fat locally on said surface, and then removing said fat from said surface.

20. The method of cooling melted fatty substances which consists in subjecting the substance to the action of a dry blast and projecting the therein-contained fat in a finely-divided condition by means of said blast onto the surface of a rotating drum, then further cooling said fat locally at a point substantially diametically opposite the point of deposit, and then removing said fat from said drum.

21. The method of cooling melted fatty substances which consists in subjecting the substance to the action of a dry cool blast and projecting the therein-contained fat in a finely-divided condition by means of said blast onto the surface of a rotating drum, then further cooling said fat locally while on said drum, and then removing said fat from said drum.

In witness whereof I have hereunto set my hand in presence of two witnesses.

ARCHIBALD RALPH WILSON.

Witnesses:
HENRY BIRKBECK,
H. D. JAMESON.